US009755208B2

(12) United States Patent
Iwai et al.

(10) Patent No.: US 9,755,208 B2
(45) Date of Patent: *Sep. 5, 2017

(54) NON-AQUEOUS-SECONDARY-BATTERY SEPARATOR AND NON-AQUEOUS SECONDARY BATTERY

(71) Applicant: TEIJIN LIMITED, Osaka-shi, Osaka (JP)

(72) Inventors: Ayumi Iwai, Yamaguchi (JP); Takashi Yoshitomi, Yamaguchi (JP); Satoshi Nishikawa, Yamaguchi (JP)

(73) Assignee: TEIJIN LIMITED, Osaka (JP)

( * ) Notice: Subject to any disclaimer, the term of this patent is extended or adjusted under 35 U.S.C. 154(b) by 15 days.

This patent is subject to a terminal disclaimer.

(21) Appl. No.: 14/651,407

(22) PCT Filed: Mar. 5, 2014

(86) PCT No.: PCT/JP2014/055631
§ 371 (c)(1),
(2) Date: Jun. 11, 2015

(87) PCT Pub. No.: WO2014/136838
PCT Pub. Date: Sep. 12, 2014

(65) Prior Publication Data
US 2015/0380707 A1  Dec. 31, 2015

(30) Foreign Application Priority Data

Mar. 6, 2013 (JP) ................................. 2013-044185

(51) Int. Cl.
*H01M 2/16* (2006.01)
*H01M 10/0525* (2010.01)

(52) U.S. Cl.
CPC ......... *H01M 2/1686* (2013.01); *H01M 2/162* (2013.01); *H01M 2/1653* (2013.01); *H01M 10/0525* (2013.01)

(58) Field of Classification Search
CPC ..... H01M 2/14; H01M 2/1606; H01M 2/1686
See application file for complete search history.

(56) References Cited

U.S. PATENT DOCUMENTS

| 2009/0155678 A1* | 6/2009 | Less | H01M 2/1673 429/144 |
| 2011/0117439 A1* | 5/2011 | Yamada | B01D 67/0027 429/254 |
| 2011/0293976 A1* | 12/2011 | Chiba | H01M 2/166 429/94 |
| 2012/0145468 A1* | 6/2012 | Pekala | C08J 5/18 180/65.31 |
| 2012/0251853 A1 | 10/2012 | Kim et al. | |
| 2012/0328929 A1* | 12/2012 | Matsumoto | H01G 9/02 429/144 |
| 2013/0157130 A1* | 6/2013 | Tamaki | H01M 10/0525 429/211 |

FOREIGN PATENT DOCUMENTS

| JP | 2006-092829 A | 4/2006 |
| JP | 201261791 A | 3/2012 |
| JP | 4988972 B1 | 8/2012 |
| JP | 4988973 B1 | 8/2012 |
| JP | 2012-209235 A | 10/2012 |
| JP | 5129895 B2 | 1/2013 |

OTHER PUBLICATIONS

Hun Lee et al., "Polyvinylidene Fluoride-co-Chlorotrifluoroethylene and Polyvinylidene Fluoride-co-Hexafluoropropylene Nanofiber-Coated Polypropylene Microporous Battery Separator Membranes", Journal of Polymer Science, Part B: Polymer Physics, 2013 (published online Nov. 27, 2012), pp. 349-357, vol. 51.
Mataz Alcoutlabi et al., "Preparation and properties of nanofiber-coated composite membranes as battery separators via electrospinning", J. Mater. Sci., 2013 (published online Dec. 11, 2012), pp. 2690-2700, vol. 48.
Yoon-Sung Lee et al., "Cycling performance of lithium-ion batteries assembled with a hybrid composite membrane prepared by an electrospinning method", Journal of Power Sources, 2010, pp. 6197-6201, vol. 195.
International Search Report of PCT/JP2014/055631 dated Apr. 8, 2014 [PCT/ISA/210].

* cited by examiner

*Primary Examiner* — Olatunji Godo
(74) *Attorney, Agent, or Firm* — Sughrue Mion, PLLC

(57) ABSTRACT

Provided is a non-aqueous-secondary-battery separator including: a microporous membrane; and an adhesive porous layer which is provided on one or both surfaces of the microporous membrane and includes a fibrillar polyvinylidene fluoride resin, in which an average hole diameter acquired from the specific surface area of the microporous membrane is greater than 90 nm and equal to or smaller than 250 nm, peeling strength between the microporous membrane and the adhesive porous layer is equal to or greater than 0.10 N/cm, and a fibrillar diameter acquired from the specific surface area of the adhesive porous layer is from 50 nm to 70 nm.

4 Claims, No Drawings

NON-AQUEOUS-SECONDARY-BATTERY SEPARATOR AND NON-AQUEOUS SECONDARY BATTERY

CROSS REFERENCE TO RELATED APPLICATIONS

This application is a National Stage of International Application No. PCT/JP2014/055631, filed Mar. 5, 2014 (claiming priority based on Japanese Patent Application No. 2013-044185, filed Mar. 6, 2013), the contents of which are incorporated herein by reference in their entirety.

TECHNICAL FIELD

The present invention relates to a non-aqueous-secondary-battery separator and a non-aqueous secondary battery.

BACKGROUND ART

A non-aqueous-secondary-battery represented by a lithium ion secondary battery has been widely used as a power source of a portable electronic apparatus such as a notebook computer, a mobile phone, a digital camera, or a camcorder. In addition, in recent years, it has also been investigated to apply such a battery to an automobile or the like in view of characteristics of high energy density.

An outer package of the non-aqueous-secondary-battery has been simplified according to miniaturization and light weight of the portable electronic apparatus. A stainless steel battery can has been initially used as the outer package, but an outer package of an aluminum can has been developed, and currently, a soft outer package of an aluminum laminate package has been also developed. In a case of using the aluminum laminate soft outer package, the outer package is flexible, and accordingly, a space may be formed between an electrode and a separator due to charging and discharging, and this may lead to a technical problem of a short cycle life. In order to solve such a problem, a technology of adhering the electrode and the separator is important and a number of technical proposals have been made.

As one proposal, a technology of using a separator in which a porous layer (hereinafter, also referred to as an adhesive porous layer) formed of a polyvinylidene fluoride resin is formed on a polyolefin microporous membrane which is a separator of the related art, has been known (for example, see PTL 1 to PTL 4). When the adhesive porous layer is subjected to hot pressing to be overlapped with an electrode in a state of including an electrolyte, the adhesive porous layer can cause the electrode and the separator to excellently adhere to each other and has a function as an adhesive. Therefore, it is possible to improve the length of the cycle life of the soft package battery.

In addition, when manufacturing the battery using a metal can outer package of the related art, the electrode and the separator are wound in a state of being overlapped with each other to manufacture a battery element, this element is enclosed in the metal can outer package with the electrolyte, and the battery is manufactured. Meanwhile, when manufacturing the soft package battery using the separators disclosed in PTL 1 to PTL 4, the battery element is manufactured in the same manner as the case of the metal can outer package described above, this is enclosed in the soft outer package with the electrolyte, a hot pressing step is finally applied thereto, and the battery is manufactured. Accordingly, when using the separator including the adhesive porous layer, it is possible to manufacture the battery element in the same manner as the case of the battery of the metal can outer package described above, and accordingly, it is not necessary to make a lot of modifications to the manufacturing step of the metal can outer package battery of the related art.

CITATION LIST

Patent Literature

PTL 1: Japanese Patent No. 4988972
PTL 2: Japanese Patent No. 5129895
PTL 3: Japanese Patent No. 4988973
PTL 4: JP-A-2012-61791

SUMMARY OF INVENTION

Technical Problem

However, in PTL 1 to PTL 3, the focus is on adhesiveness between the separator and the electrode, and there is no consideration about the handling ability for the separator, for example, the adhesive porous layer is easily detached from the polyolefin microporous membrane in battery manufacturing or the like. If the adhesive porous layer is easily detached from the polyolefin microporous membrane, this may cause a decrease in the manufacturing yield of the separator or the battery. Therefore, it is important to increase the adhesiveness (peeling strength) between the adhesive porous layer and the polyolefin microporous membrane and to improve the handling ability for the separator.

Meanwhile, when the separator is subjected to hot pressing, for example, in order to increase the adhesive strength between the adhesive porous layer and the polyolefin microporous membrane, holes in the adhesive porous layer are collapsed or holes of the boundary between the adhesive porous layer and the polyolefin microporous membrane are blocked, and as a result, ionic permeability may decrease.

In regards to this point, PTL 4 discloses a technology of satisfying the peeling strength between a polypropylene porous film and a fluorine resin membrane and air permeability thereof. However, in PTL 4, no sufficient investigation has been made regarding improvement of the adhesiveness between the electrode and the separator.

In recent years, various high capacity type positive electrode materials or negative electrode materials have been developed, in order to achieve high capacity of a lithium ion secondary battery. However, in a case of the high capacity type positive and negative electrode materials, volume change is comparatively large at the time of charging and discharging, and as will be described later, battery characteristics may be deteriorated due to the volume change of the electrode.

Since the separator is disposed between the positive electrode and the negative electrode in the battery, a compressive force or a restoring force operates in a thickness direction of the separator due to expansion and contraction of the electrode accompanied with charging and discharging of the battery. In a case of the low capacity type positive and negative electrode materials such as lithium cobalt oxide or hard carbon of the related art, the volume change of the electrode is small. Accordingly, deformation in the thickness direction of the separator is also slight and there is no particular effect on the battery characteristics. However, when the electrode material having a large volume change at the time of charging and discharging is used, an acting force applied to the separator from the electrode is also large.

When the separator does not follow the volume change of the electrode and it is difficult to restore the state thereof from a state where a porous structure of the separator is compressed, a sufficient amount of electrolyte may not be maintained in holes of the separator, which is a so-called liquid shortage phenomenon. The liquid shortage phenomenon may lead to a decrease in repeated charging and discharging characteristics (cycling characteristics) of the battery. However, in PTL 1 to PTL 4, there is no consideration about such liquid shortage.

From such circumstances, an object of the invention is to provide a non-aqueous-secondary-battery separator which can ensure sufficient ionic permeability and handling ability, has excellent adhesiveness with an electrode and also has an excellent liquid shortage prevention effect.

Solution to Problem

The invention employs the following configurations in order to solve the above-mentioned problems.

1. A non-aqueous-secondary-battery separator including: a microporous membrane; and an adhesive porous layer which is provided on one or both surfaces of the microporous membrane and includes a fibrillar polyvinylidene fluoride resin, in which an average hole diameter acquired from the specific surface area of the microporous membrane is greater than 90 nm and equal to or smaller than 250 nm, peeling strength between the microporous membrane and the adhesive porous layer is equal to or greater than 0.10 N/cm, and a fibrillar diameter acquired from the specific surface area of the adhesive porous layer is from 50 nm to 70 nm.

2. The non-aqueous-secondary-battery separator according to 1, in which an average hole diameter acquired from the specific surface area of the adhesive porous layer is from 37 nm to 74 nm.

3. A non-aqueous secondary battery using the separator according to 1 or 2.

Advantageous Effects of Invention

According to the invention, it is possible to provide a non-aqueous-secondary-battery separator which can ensure sufficient ionic permeability and handling ability, has excellent adhesiveness with an electrode and also has an excellent liquid shortage prevention effect.

DESCRIPTION OF EMBODIMENTS

Hereinafter, embodiments of the invention will be sequentially described. The description and examples are merely an example of the invention, and the scope of the invention is not limited. In addition, a numerical range shown with the term "to" in the specification shows a range including numerical values before and after "to" as a minimum value and a maximum value.

<Non-Aqueous-Secondary-Battery Separator>

There is provided a non-aqueous-secondary-battery separator according to the invention including a microporous membrane; and an adhesive porous layer which is provided on one or both surfaces of the microporous membrane and includes a fibrillar polyvinylidene fluoride resin, in which an average hole diameter acquired from the specific surface area of the microporous membrane is greater than 90 nm and equal to or smaller than 250 nm, peeling strength between the microporous membrane and the adhesive porous layer is equal to or greater than 0.10 N/cm, and a fibrillar diameter acquired from the specific surface area of the adhesive porous layer is from 50 nm to 70 nm.

According to the invention, it is possible to provide a non-aqueous-secondary-battery separator which can ensure sufficient ionic permeability and handling ability, has excellent adhesiveness with an electrode and also has an excellent liquid shortage prevention effect. When the separator of the invention is used, it is possible to provide a battery having excellent battery characteristics such as cycling characteristics or rate characteristics. In addition, when manufacturing the battery or the separator, it is possible to prevent the peeling of the adhesive porous layer from the separator or generation of defective products when slitting the separator, and it is also possible to contribute to an improvement of manufacturing yield.

[Adhesive Porous Layer]

The adhesive porous layer of the invention is a porous layer which is provided on one or both surfaces of the microporous membrane and includes a fibrillar polyvinylidene fluoride resin. In the adhesive porous layer, fibrillar polyvinylidene fluoride resins are connected to configure a three-dimensional network structure, and a plurality of micropores are provided. The micropores are connected to each other. Accordingly, air or liquid can pass through one surface to the other surface of the adhesive porous layer. In addition, the adhesive porous layer is provided on one or both surfaces of the microporous membrane as an outermost layer of the separator and is adhered to the electrode.

The adhesive porous layer may contain filler formed of an inorganic material or an organic material or other components, within a scope not disturbing the effects of the invention. By including the filler, it is possible to improve slipping properties or heat resistance of the separator. Examples of the inorganic filler include metal oxide such as alumina or metal hydroxide such as magnesium hydroxide. Examples of the organic filler include an acrylic resin.

(Polyvinylidene Fluoride Resin)

In the invention, as the polyvinylidene fluoride resin (hereinafter, suitably referred to as PVDF-based resin), a homopolymer of vinylidene fluoride (that is, polyvinylidene fluoride), a copolymer of vinylidene fluoride and another copolymerizable monomer, or a mixture thereof is suitably used. As the monomer copolymerizable with vinylidene fluoride, one kind or two or more kinds of tetrafluoroethylene, hexafluoropropylene, a trifluoro ethylene, trichloroethylene, and vinyl fluoride can be used. The polyvinylidene fluoride resin preferably contains equal to or greater than 70% by mol of vinylidene fluoride as a constitutional unit. In a bonding step performed with the electrode, a polyvinylidene fluoride resin containing equal to or greater than 98% by mol of vinylidene fluoride as a constitutional unit is suitable, in a viewpoint of ensuring sufficient mechanical properties.

As the PVDF-based resin, it is preferable to use a resin having weight average molecular weight of 600,000 to 3,000,000. When the PVDF-based resin having weight average molecular weight equal to or greater than 600,000 is used, the adhesion force with the electrode is sufficiently high and the ionic permeability after adhesion with the electrode is sufficiently acquired. In such viewpoints, it is more preferable that the weight average molecular weight of the PVDF-based resin is equal to or greater than 800,000. When the weight average molecular weight thereof is equal to or smaller than 3,000,000, a viscosity at the time of molding does not increase, and accordingly, excellent moldability is obtained, and preferable porous structure can be acquired in order to perform excellent crystallization of the adhesive porous layer. In such viewpoints, it is more preferable that the weight average molecular weight thereof is equal to or smaller than 2,000,000. Herein, the weight average molecular weight of the polyvinylidene fluoride resin can be acquired by gel permeation chromatography (GPC method).

The polyvinylidene fluoride resin having comparatively high molecular weight as described above can be acquired by preferably emulsion polymerization or suspension polymerization, and particularly preferably suspension polymerization.

(Various Physical Properties of Adhesive Porous Layer)

In the invention, it is necessary that a fibrillar diameter acquired from the specific surface area of the adhesive porous layer is from 50 nm to 70 nm. When the fibrillar diameter of the adhesive porous layer is equal to or greater than 50 nm, it is possible to additionally increase the adhesion force between the electrode and the separator while maintaining the ionic permeability and the peeling strength. In such a viewpoint, the fibrillar diameter of the adhesive porous layer is preferably equal to or greater than 53 nm and more preferably equal to or greater than 55 nm. When the fibrillar diameter of the adhesive porous layer is equal to or smaller than 70 nm, more excellent ionic permeability is obtained. In such a viewpoint, the fibrillar diameter of the adhesive porous layer is preferably equal to or smaller than 65 nm and more preferably equal to or smaller than 63 nm.

In the invention, it is preferable that an average hole diameter acquired from the specific surface area of the adhesive porous layer is from 37 nm to 74 nm. When the average hole diameter of the adhesive porous layer is equal to or smaller than 74 nm, it is possible to additionally increase the adhesion force between the electrode and the separator while maintaining the ionic permeability and the peeling strength described above. In such a viewpoint, the average hole diameter of the adhesive porous layer is preferably equal to or smaller than 70 nm and more preferably equal to or smaller than 65 nm. When the average hole diameter of the adhesive porous layer is equal to or greater than 34 nm, more excellent ionic permeability is obtained. In such a viewpoint, the average hole diameter of the adhesive porous layer is preferably equal to or greater than 45 nm and more preferably equal to or greater than 55 nm.

A control method of the fibrillar diameter or the average hole diameter of the adhesive porous layer is not particularly limited, but a method of adjusting a composition or molecular weight of the PVDF-based resin or conditions of each step of a manufacturing method which will be described later (for example, composition or temperature of coating liquid or composition or temperature of congealed liquid) is employed, for example.

Herein, in the invention, it is assumed that the entire configuration of the PVDF-based resin fibril is a cylindrical fibril, and the fibrillar diameter of the adhesive porous layer is calculated from a measurement result of a volume and a surface area of the PVDF-based resin. In addition, it is assumed that the structure of all pores has a cylindrical shape, and the average hole diameter of the pores in the adhesive porous layer is calculated from a measurement result of a volume and a surface area of the pores. Hereinafter, a calculation method thereof will be described.

(1) Surface Area of PVDF-Based Resin

First, a specific surface area $S_t$ of the non-aqueous-secondary-battery separator and a specific surface area $S_s$ of the microporous membrane which is a base material are acquired by a measurement method (method based on JIS Z 8830, so-called BET method) of the specific surface area by the following gas absorption method.

An $N_2$ absorption amount of each sample is acquired for using $N_2$ as an adsorbate, and the specific surface area S is acquired from the obtained $N_2$ absorption amount using a BET equation shown with the following equation (1).

$$1/[W \cdot \{(P_0/P)-1\}] = \{(C-1)/(W_m \cdot C)\}(P/P_0)(1/(W_m \cdot C)) \quad (1)$$

Herein, in the equation (1), P represents pressure of gas of an adsorbate of adsorption equilibrium, $P_0$ represents saturated vapor pressure of an adsorbate of adsorption equilibrium, W represents an adsorption amount of the adsorption equilibrium pressure P, $W_m$ represents a single numerator adsorption amount, and C represents BET constant. When an x axis is set as relative pressure $P_0/P$ and a y axis is set as $1/[W \cdot \{(P_0/P)-1\}]$, a linear plot (so-called BET plot) is obtained. When the inclination of the plot is set as A and an intercept thereof is set as B, the single numerator adsorption amount $W_m$ is as shown in the following equation (2).

$$W_m = 1/(A+B) \quad (2)$$

Next, the specific surface area S is acquired by the following equation (3).

$$S = (W_m \cdot N \cdot A_{cs} \cdot M)/w \quad (3)$$

Herein, N represents Avogadro's number, M represents molecular weight, $A_{cs}$ represents an adsorption cross section area, and w represents sample weight. In a case of using $N_2$, the adsorption cross section area $A_{cs}$ is 0.16 nm$^2$.

By adding the weight W configuring the sample to the obtained specific surface area S, it is possible to obtain the surface area of each constituent material in the sample. That is, when the weight of the PVDF-based resin is set as $W_p$ and the weight of the microporous membrane is set as $W_s$, the surface area of the PVDF-based resin is acquired by $S_t \cdot (W_p + W_s) - (S_s \cdot W_s)$. The surface area of the microporous membrane is acquired by $S_s \cdot W_s$.

(2) Average Fibrillar Diameter of PVDF-Based Resin Fibril

It is assumed that the PVDF-based resin of the adhesive porous layer is configured with a fibrillar fiber. When total volume of the fibrillar fiber is set as $V_{t1}$, a diameter of the fibril is set as $R_{t1}$, and total length of the fibril is set as $L_{t1}$, the following equations (4) to (6) are satisfied.

$$S_t \cdot (W_p + W_s) - (S_s \cdot W_s) = \pi \cdot R_{t1} \cdot L_{t1} \quad (4)$$

$$V_{t1} = \pi \cdot (R_{t1}/2)^2 \cdot L_{t1} \quad (5)$$

$$V_{t1} = W_p/d_p \quad (6)$$

Herein, $d_p$ is specific gravity of the PVDF-based resin. It is possible to acquire an average fibrillar diameter $R_{t1}$ of the PVDF-based resin fibril from the equations (4) to (6).

(3) Average Hole Diameter of Pores in Adhesive Porous Layer

The average hole diameter of the pores in the adhesive porous layer is calculated by the following method by assuming that the pores have a cylindrical shape, from the specific surface area of the adhesive porous layer.

When total pore volume is set as $V_{t2}$, a diameter of the cylindrical pore is set as $R_{t2}$, total length of the cylindrical pore is set as $L_{t2}$, and a porosity is set as $\epsilon$, the following equations (7) to (9) are satisfied.

$$S_t \cdot (W_p + W_s) - S_s \cdot W_s = \pi \cdot R_{t2} \cdot L_{t2} \quad (7)$$

$$V_{t2} = \pi \cdot (R_{t2}/2)^2 \cdot L_{t2} \quad (8)$$

$$V_{t2} = \epsilon \cdot (W_p/d_p + V_{t2}) \quad (9)$$

It is possible to acquire the average hole diameter $R_{s2}$ of the pores in the adhesive porous layer from the equations (7) to (9).

It is preferable that the adhesive porous layer is on both surfaces of the microporous membrane, instead of on only one surface thereof, in order to achieve excellent cycling characteristics of the battery. This is because that, when the adhesive porous layer is provided on both surfaces of the microporous membrane, both surfaces of the separator excellently adhere with both electrodes through the adhesive porous layer.

In the invention, a film thickness of the adhesive porous layer is preferably from 0.5 μm to 5 μm on one surface of the microporous membrane, in order to ensure adhesiveness with the electrodes and high energy density.

In the invention, the porosity of the adhesive porous layer is preferably from 30% to 60%. When the porosity of the adhesive porous layer is equal to or greater than 30%, the excellent ionic permeability is obtained. When the porosity of the adhesive porous layer is equal to or smaller than 60%, a rate of hole area of the surface is not excessively high and more excellent adhesiveness with the electrodes is obtained. In addition, when the porosity thereof is equal to or smaller than 60%, it is possible to ensure mechanical strength so as to withstand a pressing step of adhering with the electrode.

In the invention, a coating amount of the adhesive porous layer is preferably from 0.5 g/m² to 1.5 g/m² on one surface of the microporous membrane, in viewpoints of the adhesiveness with the electrode and the ionic permeability. When the coating amount is equal to or greater than 0.5 g/m², more excellent adhesiveness with the electrode is obtained. Meanwhile, when the coating amount is equal to or smaller than 1.5 g/m², more excellent ionic permeability is obtained, and as a result, more excellent load characteristics of the battery is obtained.

In a case where the adhesive porous layer is provided on both surfaces of the microporous membrane, the coating amount of the adhesive porous layer is preferably from 1.0 g/m² to 3.0 g/m² as the total of both surfaces.

In the invention, in a case where the adhesive porous layer is provided on both surfaces of the microporous membrane, a difference between the coating amount of one surface and the coating amount of the other surface is preferably equal to or smaller than 20% with respect to total coating amount of both surfaces. When the difference is equal to or smaller than 20%, the separator is hardly curled, and as a result, an excellent handling ability is obtained, and the cycling characteristics hardly decrease.

[Microporous Membrane]

In the invention, in the microporous membrane, fibrillar resins are connected to configure a three-dimensional network structure, and a plurality of micropores are provided. The micropores are connected to each other. Accordingly, air or liquid can pass through one surface to the other surface of the microporous membrane.

In the invention, it is necessary that the average hole diameter acquired from the specific surface area of the microporous membrane is greater than 90 nm and equal to or smaller than 250 nm. When the average hole diameter of the microporous membrane is greater than 90 nm, excellent ionic permeability is obtained. When the average hole diameter of the microporous membrane is equal to or smaller than 250 nm, excellent peeling strength is obtained. In general, in a case of a microporous membrane having a comparatively great hole diameter with an average hole diameter exceeding 90 nm, excellent ionic permeability is obtained, but the number of intersections with the adhesive porous layer decreases, and accordingly, the peeling strength tends to decrease. However, in the invention, it is possible to increase the peeling strength between the microporous membrane and the adhesive porous layer, by adjusting the fibrillar diameter of the adhesive porous layer to be 50 to 70 nm. Meanwhile, it is found that, although the fibrillar diameter of the adhesive porous layer described above is obtained, when the average hole diameter of the microporous membrane is greater than 250 nm, the number of intersections between the microporous membrane and the adhesive porous layer significantly decreases, and accordingly, it is difficult to prevent a decrease in peeling strength. In the invention, it is found that, it is possible to obtain an excellent liquid shortage prevention effect and to improve cycling characteristics of the battery, by adjusting the average hole diameter of the microporous membrane to be greater than 90 nm and equal to or smaller than 250 nm and by adjusting the fibrillar diameter of the adhesive porous layer to be 50 to 70 nm. In such viewpoints, the average hole diameter of the microporous membrane is preferably equal to or greater than 95 nm and more preferably equal to or greater than 100 nm. In addition, the average hole diameter of the microporous membrane is preferably equal to or smaller than 220 nm and more preferably equal to or smaller than 205 nm.

The control method of the average hole diameter of the microporous membrane is not particularly limited, but, a method of adjusting conditions of each step in manufacturing of the microporous membrane (for example, molecular weight of a raw material polymer, draw ratio, or thermal treatment conditions), or a method of selecting the microporous membrane satisfying the average hole diameter described above, is used, for example.

In addition, the average hole diameter of the microporous membrane is acquired as follows. That is, as described above, when the specific surface area of the microporous membrane is set as $S_s$ and the weight is set as $W_s$, the surface area of the microporous membrane is acquired by $S_s \cdot W_s$. It is assumed that the microporous membrane is configured with the fibrillar fiber, and the pores are cylindrical holes. The volume of total fibrillar fiber is set as $V_{s1}$ and the volume of total pores is set as $V_{s2}$. When the diameter of the fibril is set as $R_{s1}$, the diameter of the cylindrical hole is set as $R_{s2}$, total length of the fibril is set as $L_{s1}$, and total length of the cylindrical hole is set as $L_{s2}$, the following equations (10) to (14) are satisfied.

$$S_s \cdot W_s = \pi \cdot R_{s1} \cdot L_{s1} = \pi \cdot R_{s2} \cdot L_{s2} \tag{10}$$

$$V_{s1} = \pi \cdot (R_{s1}/2)^2 \cdot L_{s1} \tag{11}$$

$$V_{s2} = \pi \cdot (R_{s2}/2)^2 \cdot L_{s2} \tag{12}$$

$$V_{s2} = \epsilon \cdot (V_{s1} + V_{s2}) \tag{13}$$

$$V_{s1} = W_s/d_s \tag{14}$$

Herein, $\epsilon$ represents porosity and $d_s$ represents specific gravity of the resin configuring the microporous membrane. It is possible to acquire $R_{s1}$ (fibrillar diameter of the microporous membrane) and $R_{s2}$ (average hole diameter of the microporous membrane) from the equations (10) to (14).

As the material configuring the microporous membrane, any materials can be used, as long as it is a usable resin material having electrochemical stability in the battery, but a thermoplastic resin or a heat-resistant resin can be used, for example. Particularly, it is preferable to use the thermoplastic resin, in order to apply a shut-down function to the microporous membrane. Herein, the shut-down function is a function of blocking the movement of ions by dissolving the thermoplastic resin and closing the holes in the microporous membrane, and preventing thermal runway of the battery, when the battery temperature is increased. As the thermoplastic resin, a thermoplastic resin having a melting point which is lower than 200° C. is used.

Particularly, the microporous membrane using polyolefin is suitable as the microporous membrane. As the polyolefin microporous membrane, a polyolefin microporous membrane which has sufficient mechanical properties and ionic permeability and is used in the non-aqueous-secondary-battery separator of the related art can be used. The polyolefin microporous membrane preferably contains polyethylene and preferably has the content of polyethylene equal to or greater than 95% by weight, in order to have the shut-down function described above.

Separately, the polyolefin microporous membrane containing polyethylene and polypropylene is preferable, in order to apply heat resistance so as not to be easily broken when the membrane is exposed to a high temperature. As such a polyolefin microporous membrane, a microporous membrane in which polyethylene and polypropylene are mixed in one sheet is used. The microporous membrane preferably contains equal to or greater than 95% by weight of polyethylene and equal to or smaller than 5% by weight of polypropylene, in order to satisfy both the shut-down function and heat resistance. In order to satisfy both the shut-down function and heat resistance, it is also preferable to use the polyolefin microporous membrane which has a structure of at least two layers or more, and has a laminate structure in which one layer of the two layers contains polyethylene and the other layer contains polypropylene.

A weight average molecular weight of polyolefin is preferably from 100,000 to 5,000,000. When the weight average molecular weight is smaller than 100,000, it may be difficult to ensure sufficient mechanical properties. In addition, when the weight average molecular weight is greater than 5,000,000, the shut-down function may be degraded or it may be difficult to perform the molding.

Such a polyolefin microporous membrane can be manufactured with the following method, for example. That is, a method of forming a microporous membrane by sequentially executing (i) a step of extruding and sheeting a melted polyolefin resin from a T-die, (ii) a step of performing a crystallization process with respect to the sheet, (iii) a step of stretching the sheet, and (iv) a step of performing thermal treatment of the sheet is used. In addition, a method of forming a microporous membrane by sequentially executing (i) a step of melting the polyolefin resin with a plasticizer such as liquid paraffin and extruding this from a T-die, and cooling and sheeting this, (ii) a step of stretching the sheet, (iii) a step of extracting the plasticizer from the sheet, and (iv) a step of performing thermal treatment of the sheet is also used.

In the invention, the film thickness of the microporous membrane is preferably in a range of 5 μm to 25 μm, in order to obtain excellent mechanical properties and internal resistance. A Gurley value (JIS P8117) of the microporous membrane is preferably in a range of 50 sec/100 cc to 800 sec/100 cc, in order to prevent short circuit of the battery and to obtain sufficient ionic permeability. A piercing strength of the microporous membrane is preferably equal to or greater than 300 g, in order to improve the manufacturing yield.

[Various Physical Properties of Separator]

In the invention, the peeling strength between the microporous membrane and the adhesive porous layer is preferably equal to or greater than 0.10 N/cm. When the peeling strength is equal to or greater than 0.10 N/cm, excellent handling properties of the separator is obtained, it is possible to suitably prevent detachment of the adhesive porous layer in the manufacturing step of the separator or the battery, and the manufacturing yield is improved. In such viewpoints, the peeling strength is preferably equal to or greater than 0.14 N/cm and more preferably equal to or greater than 0.20 N/cm.

The control method of the peeling strength between the microporous membrane and the adhesive porous layer is not particularly limited, but in addition to the adjustment of the average hole diameter of the microporous membrane or the fibrillar diameter of the adhesive porous layer described above, various methods such as (chemical and physical) surface reforming of a base material, adjustment of concentration of PVDF-based resin in a coating solution, control of the contact surface area of the boundary between the microporous membrane and the adhesive porous layer (impregnated state of microporous membrane with a solvent before coating), addition of a polymer (cyanoethyl polyvinyl alcohol or the like) for increasing coating pressure or a shear velocity of coating roll, and adhesiveness, gelation of the coating solution can be used.

In viewpoints of mechanical strength and energy density when the battery is obtained, total film thickness of the separator of the invention is preferably from 5 μm to 35 μm and more preferably from 10 μm to 20 μm.

A porosity of the separator of the invention is preferably from 30% to 60%, in viewpoints of the adhesiveness with the electrode, mechanical strength, and ionic permeability.

A Gurley value (JIS P8117) of the separator of the invention is preferably from 50 sec/100 cc to 800 sec/100 cc, in order to have good balance between mechanical strength and membrane resistance.

Regarding the separator of the invention, a difference between the Gurley value of the microporous membrane and the Gurley value of the separator provided with the adhesive porous layer on the microporous membrane is preferably equal to or smaller than 300 sec/100 cc, more preferably equal to or smaller than 150 sec/100 cc, and even more preferably equal to or smaller than 100 sec/100 cc, in a viewpoint of the ionic permeability.

The membrane resistance of the separator of the invention is preferably 1 ohm·cm$^2$ to 10 ohm·cm$^2$, from a viewpoint of load characteristics of the battery. Herein, the membrane resistance is a resistance value when the separator is impregnated with the electrolyte, and is measured by an alternating current method. Although it is different depending on the kinds and temperature of the electrolyte, the numerical value described above is a numerical value measured at 20° C. using 1M LiBF4—propylene carbonate/ethylene carbonate (mass ratio 1/1) as the electrolyte.

Thermal shrinkage of the separator of the invention at 105° C. is preferably equal to or smaller than 10% in both MD direction and TD direction. When the thermal shrinkage is in this range, morphological stability of the separator and the shut-down properties are balanced. The thermal shrinkage is more preferably equal to or smaller than 5%.

[Manufacturing Method of Non-Aqueous-Secondary-Battery Separator]

The non-aqueous-secondary-battery separator of the invention described above can be manufactured by a method of directly applying a solution containing the PVDF-based resin, for example, on the microporous membrane, solidifying the PVDF-based resin, and integrally forming the adhesive porous layer on the microporous membrane.

Specifically, first, the PVDF-based resin is dissolved in a solvent and a coating solution is prepared. This coating solution is applied to the microporous membrane and is immersed in suitable congealed liquid. Accordingly, the PVDF-based resin is solidified while causing a phase separation phenomenon. A layer formed of the PVDF-based resin in this step has a porous structure. After that, the congealed liquid is removed by water washing, and it is possible to integrally form the adhesive porous layer on the microporous membrane by drying the resultant material.

As the coating solution described above, it is possible to use a good solvent for dissolving the PVDF-based resin. As the good solvent, a polar amide solvent such as N-methylpyrrolidone, dimethyl acetamide, or dimethyl formamide can be suitably used, for example. In order to form an excellent porous structure, it is preferable, in addition to the good solvent described above, to mix a phase separating agent for causing the phase separation. Examples of the phase separating agent include water, methanol, ethanol, propyl alcohol, butyl alcohol, butanediol, ethylene glycol, propylene glycol, or tripropylene glycol. The phase separating agent is preferably added in a range so as to ensure the viscosity suitable for the coating. In a case of mixing the filler or other additives to the adhesive porous layer, those may be mixed or dissolved in the coating solution.

In the composition of the coating solution, the PVDF-based resin is preferably contained at concentration of 3% by weight to 10% by weight. As the solvent, it is preferable to use a mixed solvent containing equal to or greater than 60% by weight of the good solvent and equal to or smaller than 40% by weight of the phase separating agent, in order to form the suitable porous structure.

As the congealed liquid, water, a mixed solvent of water and the good solvent, or a mixed solvent of water, the good solvent, and the phase separating agent can be used. The mixed solvent of water, the good solvent, and the phase separating agent is particularly preferable, and in this case, it is preferable to match a mixed ratio of the good solvent and the phase separating agent with a mixed ratio of a mixed solvent used in the dissolving of the PVDF-based resin, in a viewpoint of productivity. Concentration of water is preferably from 40% by weight to 90% by weight, in order to form the excellent porous structure and improve the productivity.

In the applying of the coating solution to the microporous membrane, a coating method of the related art such as Meyer Bar, die coater, reverse roll coater, gravure coater can be used. In a case of forming the adhesive porous layer on both surfaces of the microporous membrane, the coating solution can be applied, solidified, washed with water, and dried for each surface, but it is preferable to apply, solidify, water wash, and dry the coating solution on both surfaces of the microporous membrane at same time, in the viewpoint of productivity. It is preferable that the microporous membrane is previously impregnated with a solvent to be used in the coating solution, before applying the coating solution to the microporous membrane, in order to easily obtain the peeling strength of the invention.

The separator of the invention can also be manufactured by a dry coating method, in addition to the wet coating method described above. Herein, the dry coating method is a method of applying a coating solution containing the PVDF-based resin and a solvent onto the microporous membrane, drying this to volatilize and remove the solvent, and obtaining a porous membrane. Herein, in a case of the dry coating method, the coated membrane tends to be a dense membrane compared to a case of using the wet coating method, and it is substantially impossible to obtain the porous layer if the filler or the like is not added to the coating solution. In addition, even when the filler or the like is added to the coating solution, it is difficult to obtain excellent porous structure. Accordingly, in such viewpoints, it is preferable to use the wet coating method in the invention.

[Non-Aqueous Secondary Battery]

The non-aqueous secondary battery of the invention uses the separator of the invention described above.

In the invention, the non-aqueous secondary battery has a configuration in which the separator is disposed between a positive electrode and a negative electrode and these battery elements are enclosed in an outer package with the electrolyte. As the non-aqueous secondary battery, a lithium ion secondary battery is suitable.

As the positive electrode, a configuration in which an electrode layer formed of a positive electrode active material, a binder resin, and a conductive assistant is formed on a positive electrode current collector can be used. Examples of the positive electrode active material include lithium cobalt oxide, lithium nickel oxide, lithium manganese oxide of spinel structure, or lithium iron phosphate having an olivine structure. In the invention, when the adhesive porous layer of the separator is disposed on the positive electrode side, the polyvinylidene fluoride resin has excellent oxidation resistance, and accordingly, the positive electrode active material such as $LiMn_{1/2}Ni_{1/2}O_2$ or $LiCo_{1/3}Mn_{1/3}Ni_{1/3}O_2$ which can act at high pressure equal to or greater than 4.2 V can be easily applied. As the binder resin, a polyvinylidene fluoride resin is used, for example. As the conductive assistant, acetylene black, Ketchen black, or graphite powder is used, for example. As the current collector, an aluminum foil having the thickness of 5 µm to 20 µm is used, for example.

As the negative electrode, a configuration in which an electrode layer formed of a negative electrode active material and a binder resin is formed on a negative electrode current collector can be used, and a conductive assistant may be added into the electrode layer, if necessary. As the negative electrode active material, it is possible to use a carbon material which can be electrochemically occlude lithium or a material alloying with lithium such as silicon or tin, for example. As the binder resin, a polyvinylidene fluoride resin or butylene-stadiene rubber is used, for example. As the conductive assistant, acetylene black, Ketchen black, or graphite powder is used, for example. As the current collector, a copper foil having the thickness of 5 µm to 20 µm is used, for example. In addition, it is possible to use metal lithium foil as the negative electrode, instead of the negative electrode described above.

The electrolyte has a configuration in which lithium salt is dissolved in a suitable solvent. Examples of lithium salt include $LiPF_6$, $LiBF_4$, $LiClO_4$, and the like. As the solvent, it is possible to suitably use cyclic carbonate such as ethylene carbonate, propylene carbonate, fluoroethylene carbonate, or difluoroethylene carbonate, chain-shape carbonate such as dimethyl carbonate, diethyl carbonate, ethyl methyl carbonate, and a fluorine-substituted compound thereof, cyclic ester such as γ-butyrolactone, or γ-valerolactone, or a mixed solvent thereof. Particularly, it is suitable to dissolve 0.5 M to 1.5 M of lithium salt to a solvent having a weight ratio of cyclic carbonate/chain-shaped carbonate of 20 to 40/80 to 60.

The non-aqueous-secondary-battery separator of the invention can also be used in the battery of the metal can outer package, however, since the adhesiveness with the electrode is excellent, the non-aqueous-secondary-battery separator is suitably used in the soft package battery of the aluminum laminate film outer package. In the method of manufacturing the battery, the positive electrode and negative electrode are bonded to each other through the separator, and this is impregnated with the electrolyte, and is enclosed in an aluminum laminate film. By performing hot pressing of this, it is possible to obtain the non-aqueous secondary battery. According to the configuration of the invention, it is possible to excellently adhere the separator with the electrode and to obtain the non-aqueous secondary battery having excellent cycle life. Since the adhesiveness of the electrode and the separator is excellent, the battery having excellent safety is obtained. As the bonding method of the electrode and the separator, there is a stacking method of stacking the electrode and the separator or a method of winding the electrode and the separator together, the invention can employ any of them.

EXAMPLES

Hereinafter, the invention will be described with reference to the examples. Herein, the invention is not limited to the following example.

[Measurement Method]

(Film Thickness)

The film thickness was measured using a contact-type thickness meter (manufactured by LITEMATIC mitutoyo). A cylindrical measurement terminal having a diameter of 5 mm was used, and the adjustment was performed by adding load of 7 g during the measurement.

(Specific Surface Area, Average Hole Diameter, and Fibrillar Diameter)

The specific surface area was acquired from the BET equation by the nitrogen gas adsorption method. The measurement was performed by a three-point method using NOVA-1200 (manufactured by Yuasa Ionics co. ltd.) The average hole diameter or the fibrillar diameter of the microporous membrane and the adhesive porous layer was acquired by the calculation method described above using the measured specific surface area.

(Porosity)

When constituent materials are formed as a, b, c, . . . , n, weight per area of the constituent materials is set as Wa, Wb, Wc, . . . , Wn ($g/cm^2$), real density thereof is set as xa, xb, xc, . . . , xn ($g/cm^3$), and the film thickness of the focused layer is set as t(cm), the porosity $\epsilon$(%) was acquired by the following equation.

$$\epsilon = \{1 - (Wa/xa + Wb/xb + Wc/xc + \ldots + Wn/xn)/t\} \times 100$$

The weight per area was acquired by cutting the samples to a size of 10 cm×10 cm, measuring the weight thereof, and dividing the weight by the area.

(Gurley Value)

The Gurley value was measured by Gurley-type densometer (G-B2C manufactured by TOYO SEIKI SEISAKU-SHO, LTD.) based on JIS P8117.

(Peeling Strength)

A test was performed by a T-shaped peeling method with respect to the separator which is a sample. Specifically, a sample to which Mending tape manufactured by 3M was attached to both surfaces thereof was cut to have a width of 10 mm, an edge of the tape on the adhesive porous layer side was stretched by a tension testing machine (RTC-1210A manufactured by ORIENTEC) at a rate of 20 mm/min, the adhesive porous layer was peeled from the microporous membrane, and peeling stress at that time was measured. An average value of the stress in a range of a displacement amount of 10 mm to 40 mm from the measured result was acquired. In the same manner as described above, the measurement was performed three times for each sample, total average was acquired from the average value of three times of the measurement, and this was set as the peeling strength.

(Membrane Resistance)

The separator which is a sample was cut to have a size of 2.6 cm×2.0 cm. The cut-out sample was immersed into a methanol solution obtained by dissolving 3% by weight of a nonionic surfactant (EMULGEN 210P manufactured by Kao Corporation), and then the sample was dried with air. The aluminum foil having a thickness of 20 μm was cut to have a size of 2.0 cm×1.4 cm and a lead tab was attached to this. Two sheets of this aluminum foil were prepared, and the sample was interposed between the aluminum foil sheets so that short circuit of the aluminum foil does not occur. The sample was impregnated with an electrolyte (liquid obtained by dissolving 1 mol/L of $LiBF_4$ in a solvent obtained by mixing propylene carbonate and ethylene carbonate at a weight ratio of 1:1). This was enclosed in the aluminum laminate package at reduced pressure, so that the tab is exposed to the outside of the aluminum package. Such cell was prepared so that the number of samples in the aluminum foil is 1, 2, and 3. The cell was added into a thermostat at 20° C., and resistance of the cell was measured at amplitude of 10 mV and a frequency of 100 kHz by an AC impedance method. The measured resistance value of the cell was plotted with respect to the number of samples, and this plot was set to be substantially linear, and the inclination thereof was acquired. 2.0 cm×1.4 cm which is an electrode area was multiplied by this inclination, and membrane resistance (ohm·$cm^2$) per sample was acquired.

(Handling Ability)

The separator was transported at a transportation rate of 40 m/min, an unwinding tension of 0.3 N/cm, and a winding tension of 0.1 N/cm, and the peeling of the adhesive porous layer after the transportation was visually observed. The handling ability was evaluated based on the following evaluation criteria. As foreign materials generated due to the peeling, the number of a material dropped down at the time of the transportation, a material interposed between end surfaces of a wind roll, and a material observed on the surface of the roll was counted.

<Evaluation Criteria>

A: No peeling is observed.

B: The number of foreign materials generated due to the peeling is from 1 to 5 per the area of 1000 $m^2$.

C: The number of foreign materials generated due to the peeling is greater than 5 and equal to or smaller than 20 per the area of 1000 $m^2$.

D: The number of foreign materials generated due to the peeling is greater than 20 per the area of 1000 $m^2$.

(Adhesiveness with Electrode)

(i) Preparation of Negative Electrode 300 g of artificial graphite which is the negative electrode active material, 7.5 g of a water-soluble dispersion containing 40% by weight of a modified styrene-butadiene copolymer which is a binder, 3 g of carboxymethyl cellulose which is a thickener, and a proper amount of water were stirred by a dual arm mixer, and slurry for negative electrode was prepared. The slurry for negative electrode was applied to copper foil having a thickness of 10 μm which is a negative electrode current collector, the obtained coated film was dried and pressed, and a negative electrode having a negative electrode active material layer was prepared.

(ii) Preparation of Positive Electrode 89.5 g of lithium cobalt oxide powder which is a positive electrode active material, 4.5 g of acetylene black which is a conductive assistant, and a solution obtained by dissolving polyvinylidene fluoride in NMP so as to have 6% by weight which is a binder, were stirred by a dual arm mixer so that the weight of polyvinylidene fluoride is 6% by weight, and slurry for positive electrode was prepared. The slurry for positive electrode was applied to aluminum foil having a thickness of 20 μm which is a positive electrode current collector, the obtained coated film was dried and pressed, and a positive electrode having a positive electrode active material layer was prepared.

(iii) Preparation of Battery

The prepared positive electrode and negative electrode were adhered to each other through the separator, the electrolyte was impregnated with this, this battery element was enclosed in the aluminum laminate package using a vacuum sealer and pressed using a hot pressing machine, and a battery was prepared. Herein, as the electrolyte, 1 M LiPF$_6$ ethylene carbonate/ethyl methyl carbonate (weight ratio of 3/7) was used. In the pressing conditions, a temperature was set as 90° C. and time was set as 2 minutes, in the conditions where 20 kg of an applying load is applied per 1 cm$^2$ of electrode.

(iv) Evaluation of Adhesiveness with Electrode

The battery prepared as described above was dismantled and the adhesiveness of the separator and the electrode was checked. The adhesiveness was evaluated with a relative value when the peeling strength in a case of using the separator of the example 1 was 100. When the peeling strength was equal to or greater than 80, it was evaluated as A, when the peeling strength was equal to or greater than 60 and smaller than 80, it was evaluated as B, and when the peeling strength was smaller than 60, it was evaluated as C.

(Cycling Characteristics)

Regarding the battery prepared in the "(Adhesiveness with Electrode)" section described above, 100 cycles of charging with a constant current and constant voltage of 4.0 V and discharging with a constant current of 2.75 V are repeated, and then the discharge capacity was measured. A value obtained by dividing the discharge capacity obtained after the 100 cycles by the discharge capacity obtained after 3 cycles, was set as a discharge capacity holding rate (%) and was set as an index of cycling characteristics.

(Liquid Shortage Prevention Effect)

The liquid shortage prevention effect of the non-aqueous-secondary-battery separator was evaluated by measuring the following pressure recovery rate.

The separator which is a sample was cut to have a size of 2.6 cm×2.0 cm, and the cut-out sample was immersed into a methanol solution obtained by dissolving to have a concentration of 3% by weight of a nonionic surfactant (EMULGEN 210P manufactured by Kao Corporation), and then was dried with air. The aluminum foil having a thickness of 20 μm was cut to have a size of 2.0 cm×1.4 cm and a lead tab was attached to this. Two sheets of this aluminum foil were prepared, and the cut-out sample was interposed between the aluminum foil sheets so that short circuit of the aluminum foil does not occur. A solution obtained by dissolving 1 M of LiBF$_4$ in a solvent obtained by mixing propylene carbonate and ethylene carbonate at a weight ratio of 1:1, is used as the electrolyte, and the sample was impregnated with this electrolyte. This was enclosed in the aluminum laminate package at reduced pressure, so that the tab is exposed to the outside of the aluminum package. The resistance of the cell was measured at an amplitude of 10 mV and a frequency of 100 kHz by an AC impedance method, and a resistance value (A) (ohm·cm$^2$) before the pressurization was acquired. Then, this cell was pressurized by a flat pressing machine for 5 minutes to have a pressure of 40 MPa, and then the pressure was released. This operation was repeated five times and a resistance value (B) (ohm·cm$^2$) of the cell which was pressurized and the pressure of which was released, was measured. The pressure recovery rate was acquired by the following equation. As the pressure recovery rate increases, the excellent liquid shortage prevention effect is obtained.

$$\text{(pressure recovery rate)} = \{\text{resistance value }(B)/\text{resistance value }(A)\} \times 100(\%)$$

Example 1

A copolymer (PVDF-HFP) containing 98.9/1.1 mol % of vinylidene fluoride/hexafluoropropylene and having a weight average molecular weight of 1,950,000 was used as the polyvinylidene fluoride resin. The polyvinylidene fluoride resin was dissolved in a mixed solvent having a weight ratio of dimethyl acetamide/tripropylene glycol 7/3 at a concentration of 6% by weight, and a coating solution was prepared. A polyethylene (PE) microporous membrane having an average hole diameter of 94 nm, a film thickness of 9 μm, a Gurley value of 172 sec/100 cc, and a porosity of 41% was used as the microporous membrane. Dimethyl acetamide was previously applied to this microporous membrane, an equal amount of the coating solution was further applied on both surfaces thereof, the microporous membrane was immersed in the congealed liquid (30° C.) having a weight ratio of water/dimethyl acetamide/tripropylene glycol=57/30/13 for solidification. This is washed with water and dried, and accordingly, a non-aqueous-secondary-battery separator in which the adhesive porous layer formed of the polyvinylidene fluoride resin is formed on both surfaces of the polyolefin microporous membrane was obtained.

Regarding this separator, the measured results of various physical properties of the microporous membrane, the adhesive porous layer, and the separator are shown in Table 1. The results regarding the separators of the following examples and comparative examples are collected in Table 1, in the same manner as described above.

Example 2

A non-aqueous-secondary-battery separator was obtained in the same manner as in Example 1, except for using a polyethylene microporous membrane having an average hole diameter of 110 nm, a film thickness of 9 μm, a Gurley value of 169 sec/100 cc, and a porosity of 42% as the microporous membrane.

Example 3

A non-aqueous-secondary-battery separator was obtained in the same manner as in Example 1, except for using a polyethylene microporous membrane having an average hole diameter of 210 nm, a film thickness of 12 µm, a Gurley value of 214 sec/100 cc, and a porosity of 39% as the microporous membrane, and setting the temperature of the congealed liquid to 10° C.

Comparative Example 1

A non-aqueous-secondary-battery separator was obtained in the same manner as in Example 4, except for using a polyethylene microporous membrane having an average hole diameter of 82 nm, a film thickness of 12 µm, a Gurley value of 245 sec/100 cc, and a porosity of 39% as the microporous membrane, and directly applying the coating solution without applying dimethyl acetamide to the microporous membrane in advance.

Comparative Example 2

A non-aqueous-secondary-battery separator was obtained in the same manner as in Comparative Example 1, except for using a polyethylene microporous membrane having an average hole diameter of 276 nm, a film thickness of 9 µm, a Gurley value of 130 sec/100 cc, and a porosity of 45% as the microporous membrane.

Comparative Example 3

A non-aqueous-secondary-battery separator was obtained in the same manner as in Example 1, except for using a polyethylene microporous membrane having an average hole diameter of 153 nm, a film thickness of 12 µm, a Gurley value of 171 sec/100 cc, and a porosity of 42% as the microporous membrane and setting the temperature of the congealed liquid to 0° C.

Comparative Example 4

A non-aqueous-secondary-battery separator was obtained in the same manner as in Example 1, except for setting the temperature of the congealed liquid to 50° C.

Comparative Example 5

The polyvinylidene fluoride resin was dissolved in a mixed solvent having a weight ratio of dimethyl acetamide/tripropylene glycol 8/2 at concentration of 6% by weight, and a coating solution was prepared. A non-aqueous-secondary-battery separator was obtained in the same manner as in Example 1, except for using this coating solution.

Comparative Example 6

A non-aqueous-secondary-battery separator was obtained in the same manner as in Example 1, except for using a solution obtained by setting the concentration of the polyvinylidene fluoride resin to 10% by weight as a coating solution.

Comparative Example 7

Polyvinylidene fluoride having weight average molecular weight of 1,570,000 (KF polymer W#7300 manufactured by Kureha Corporation) was used as the polyvinylidene fluoride resin. The polyvinylidene fluoride was dissolved in a mixed solvent having a weight ratio of dimethyl acetamide/tripropylene glycol of 7/3 at 5% by weight, and a coating solution was obtained. Equal amount of this was applied both surfaces of a polyethylene microporous membrane (TN0901 manufactured by SK) having a film thickness of 9 µm, a Gurley value of 160 sec/100 cc, and a porosity of 43%, and this was immersed in the congealed liquid (40° C.) having a weight ratio of water/dimethyl acetamide/tripropylene glycol=57/30/13 for solidification of polymer. This is washed with water and dried, and accordingly, a non-aqueous-secondary-battery separator in which the porous layer formed of the polyvinylidene fluoride resin is formed on both surfaces of the polyolefin microporous membrane was obtained.

TABLE 1

| | | Ex. 1 | Ex. 2 | Ex. 3 | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|---|---|---|
| Microporous membrane | Material | PE | PE | PE | PE | PE | PE | PE | PE | PE | PE |
| | Film thickness (µm) | 9 | 9 | 12 | 12 | 9 | 12 | 9 | 9 | 9 | 9 |
| | Porosity (%) | 41 | 42 | 39 | 39 | 45 | 42 | 41 | 41 | 41 | 43 |
| | Average hole diameter (nm) | 94 | 110 | 210 | 82 | 276 | 153 | 94 | 94 | 94 | 100 |
| | Gurley value (sec/100 cc) | 172 | 169 | 214 | 245 | 130 | 171 | 172 | 172 | 172 | 160 |
| Adhesive porous layer | Material | PVDF-HFP | PVDF-HFP | PVDF-HFP | PVDF-HFP | PVDF-HFP | PVDF-HFP | PVDF-HFP | PVDF-HFP | PVDF-HFP | PVDF-HFP |
| | Film thickness of one surface (µm) | 1.5 | 1.5 | 1.5 | 2 | 1 | 1 | 1.5 | 1 | 1.5 | 1.5 |
| | Porosity (%) | 52 | 53 | 55 | 38 | 59 | 53 | 58 | 47 | 51 | 47 |
| | Fibrillar diameter (nm) | 62 | 67 | 65 | 70 | 52 | 75 | 40 | 112 | 72 | 40 |
| | Average hole diameter (nm) | 62 | 52 | 78 | 27 | 74 | 55 | 70 | 42 | 38 | 72 |
| Separator physical properties | Gurley value (sec/100 cc) | 201 | 205 | 245 | 322 | 178 | 232 | 212 | 422 | 223 | 241 |
| | Peeling force (N/cm) | 0.14 | 0.12 | 0.10 | 0.12 | 0.06 | 0.12 | 0.08 | 0.16 | 0.22 | 0.08 |
| | Film resistance (ohm · cm$^2$) | 3.8 | 3.2 | 2.6 | 5.2 | 2.8 | 5.2 | 3.7 | 5.1 | 4.8 | 4.1 |
| | Handling properties | B | B | C | B | D | C | D | C | A | D |
| | Adhesiveness with electrode | A | A | B | A | A | A | C | A | A | A |
| | Cycling characteristics (%) | 91 | 89 | 92 | 69 | 93 | 81 | 87 | 84 | 91 | 88 |
| | Liquid shortage prevention effect (%) | 100 | 106 | 103 | 75 | 103 | 100 | 109 | 100 | 102 | 103 |

The invention claimed is:

1. A non-aqueous-secondary-battery separator comprising:
   a microporous membrane; and
   an adhesive porous layer which is provided on one or both surfaces of the microporous membrane and includes a fibrillar polyvinylidene fluoride resin,
   in the adhesive porous layer, fibrillar polyvinylidene fluoride resins are connected to configure a three-dimensional network structure, and a plurality of micropores are provided,
   wherein an average hole diameter acquired from a specific surface area of the microporous membrane is greater than 90 nm and equal to or smaller than 250 nm, peeling strength between the microporous membrane and the adhesive porous layer is equal to or greater than 0.10 N/cm, and
   a fibrillar diameter acquired from a specific surface area of the adhesive porous layer is from 50 nm to 70 nm.

2. The non-aqueous-secondary-battery separator according to claim 1, wherein an average hole diameter acquired from the specific surface area of the adhesive porous layer is from 37 nm to 74 nm.

3. A non-aqueous secondary battery using the separator according to claim 1.

4. A non-aqueous secondary battery using the separator according to claim 2.

* * * * *